Nov. 29, 1932.    A. M. L. TRIBOUT    1,889,504

GASOLINE DISTRIBUTING APPARATUS

Filed May 15, 1930    2 Sheets-Sheet 1

A. M. L. Tribout
INVENTOR

By: Marks Klein
ATTYS.

Nov. 29, 1932.  A. M. L. TRIBOUT  1,889,504
GASOLINE DISTRIBUTING APPARATUS
Filed May 15, 1930   2 Sheets-Sheet 2
Fig. 2.
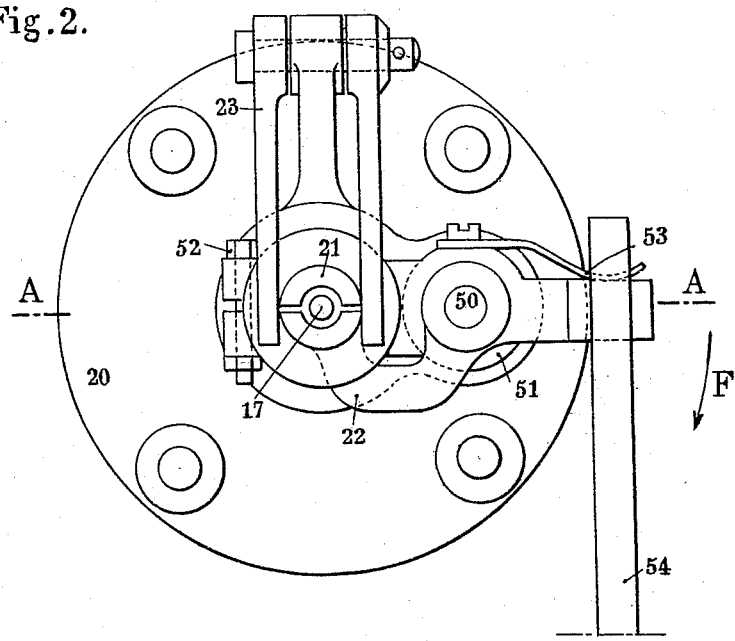
Fig. 4.
Fig. 3.
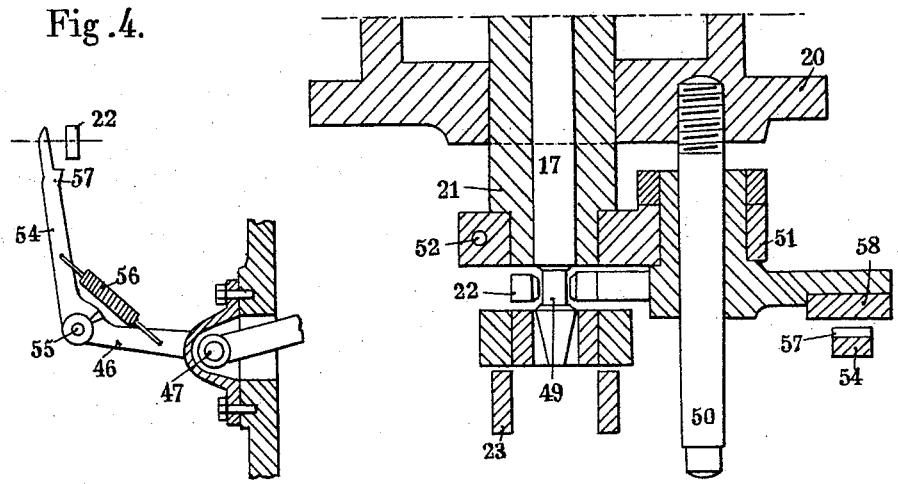

UNITED STATES PATENT OFFICE

ADRIEN MARCEL LUCIEN TRIBOUT, OF PARIS, FRANCE, ASSIGNOR TO SOCIETE D'ETUDE DES DISTRIBUTEURS AUTOMATIQUES (S. E. D. A.), OF PARIS, FRANCE

GASOLINE DISTRIBUTING APPARATUS

Application filed May 15, 1930, Serial No. 452,703, and in France May 29, 1929.

The present invention has for object an improvement in apparatus for distributing liquids in predetermined quantities, and particularly in gasoline distributing apparatus.

These apparatus, in order to fulfill in a satisfactory manner the requirements of the service for which they are intended, must present the following characteristic features:

1. Substantial construction of the members and simplicity of the mechanism.
2. Safe and positive operation without possibility of getting out of adjustment.
3. Accuracy in the measurement of the quantities dispensed.
4. Prevention of intentionally or unintentionally modifying this measurement.

The device forming the subject-matter of the present invention is adapted to provide distributing apparatus simultaneously fulfilling all the above requirements. The invention essentially consists in the direct interpositioning, between the measuring device or devices and the conduit for delivery to the consumer, of an enclosure having dimensions comparable to those of this measuring device or devices and in which moves a float the displacements of which control the operation of the distributing member, the controlling action occurring during the downward movement of the float. The speeds of flow of the liquid from the measuring device or devices into this enclosure, and from the latter into the distributing conduit, are determined in function of each other, so that the level of the liquid rises in this enclosure as long as the emptying measuring device is not completely empty.

Such as above defined in its principle, the invention can be carried out according to many forms of construction which, without departing from the scope of the said invention, can differ from each other, particularly:

(a) By the nature of the means for actuating the distributing member.

(b) By the coupling mechanism adopted, and by the nature of the means connecting it to the means actuating the distributing member.

(c) By the means used for controlling, in course of emptying, the respective outflows of the measuring device or devices, on the one hand, and of the enclosure for the float, on the other hand. so as to obtain, in the required conditions, the rising or lowering of the latter.

In the accompanying drawings:

Fig. 2 is an enlarged side view of a portion of the apparatus.

Fig. 3 is a section on the line A—A of Fig. 2.

Fig. 4 is a detail section of the operating means for the coupling device which is omitted in Fig. 1.

Figure 1:
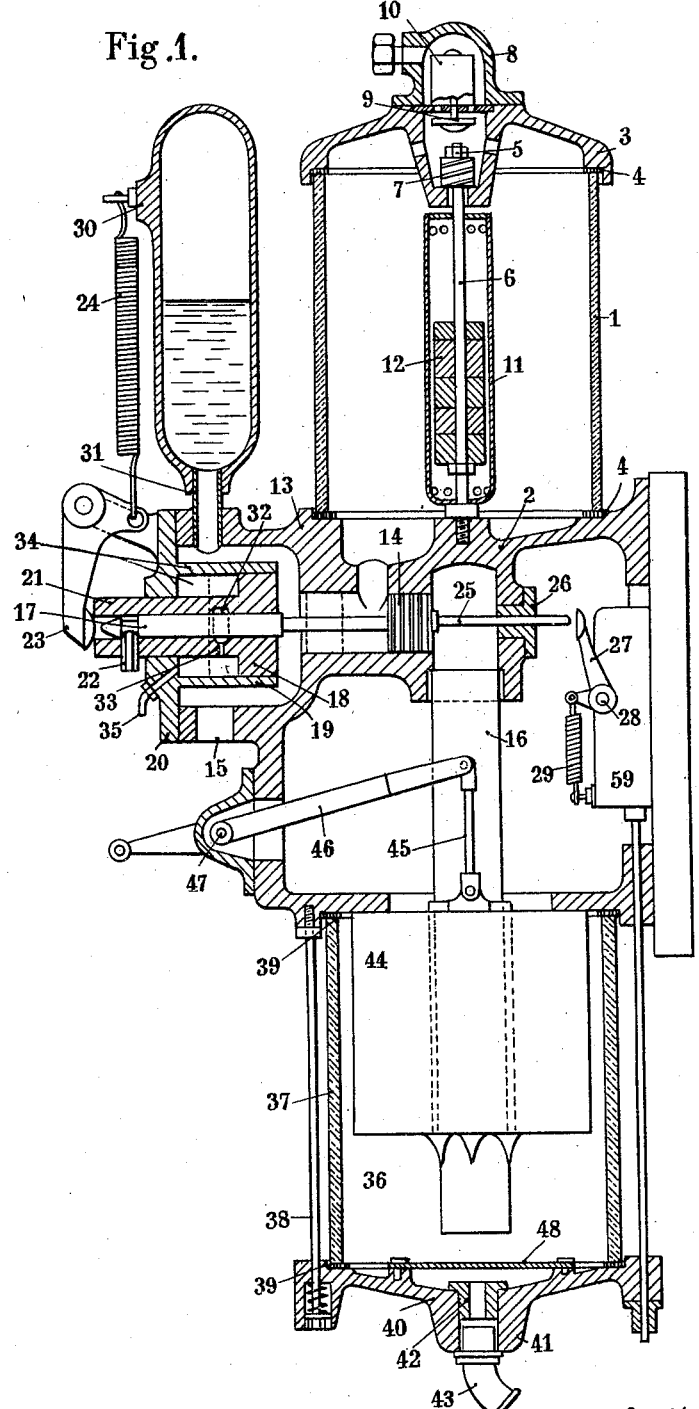
Fig. 1 is a vertical sectional view of the gasoline distributing apparatus with portions of the device for coupling and uncoupling the pistons omitted.

The gauging device 1, which is made of glass, is clamped between the body of the apparatus 2 and a plate 3, with interposition of plastic packings 4, by a nut 5 screwed on a rod 6 and bearing upon a very powerful compensating spring 7. The plate 3 supports a casing 8, the communication of which with the measuring device is controlled by a valve 9 rigid with a sealing float 10. This valve is adapted to close the upper orifice of the measuring device when the latter, under the action of the pump, has been filled to the limit with gasoline. The sleeve 11 can receive weights 12 for correcting the content of the measuring device.

The automatic distributor comprises a bored cast-iron body 13 in which moves a distributing slide valve 14, capable of putting the measuring device 1 in communication with the gasoline supply conduit 15 in its right-hand position, and with the discharge conduit 16 in its left-hand position. The rod 17 of the slide valve 14 can slide through a second piston 18 centered on the same axis as the slide valve. This piston moves in a second bored body 19, rigid with a removable plug 20. The rod 21 of the piston 18 passes through the plug 20, and it is on the portion of this rod which constantly remains outside the body of the apparatus that bears the device is located which, through the medium of a coupling key 22, couples and uncouples the slide valve 14 and the piston 18.

It is also on this portion of the rod 21 that is exerted, through the medium of a bell crank lever 23, the action of the antagonistic spring 24, having for object to effect the return of the piston 18 to its right-hand position when the pressure of the liquid on the inner face of this piston is reduced or ceases.

The distributing slide valve 14 carries an axial finger 25 which passes, with slight friction, through the guide member 26, and acts on a lever 27, pivoting about the stud 28 and returned by an antagonistic spring 29. The mechanism of a registering apparatus 59 is actuated by the displacements of the lever 27 in an anti-clockwise direction, under the action of the antagonistic spring 29, that is to say every time the measuring device 1 is put in communication with the discharge pipe 16.

This apparatus 59 can be of any suitable type.

The compressed air chamber 30 communicates with the body of the distributor through the medium of a tube 31. During the periods of filling up the body of the distributor with liquid under pressure, this liquid enters the chamber 30, compressing the air contained therein. If, during the displacement of the distributor from one of its extreme positions to the other, the pump fails to operate, the expansion of the volume of compressed air contained in the tank 30 constitutes a reserve of energy sufficient for maintaining the pressure exerted by the liquid on the pistons of the distributor until the stroke of the latter is completely terminated.

In the device described there is no passage of rods through elements such as stuffing-boxes, necessitating the exertion of considerable pressure and consequent retarding of movement. The slight leakage which may occur between the rod 17 of the distributor and the piston 18 is collected by an annular channel 32 provided in the rod 21 of this piston. From this channel the leakage fluid flows, through an orifice 33, into a chamber 34, where it collects with the eventual leakage between the piston 18 and the cylindrical body 19 wherein this piston moves. The entire leakage fluid is evacuated, through a pipe 35, into the return pipe line leading to the storage tank.

Leakage which thus occurs is always very small relatively to the outflow of the pump and cannot hinder the proper working of the distributor. Besides, as it occurs before introduction of the liquid in the body of the measuring chamber, it does not affect in any way the accuracy of the measurement of the quantities distributed.

The passage of the rod 25 through the guide member 26 does not necessitate any fluid-tight device, since the leakage fluid which might eventually flow between these two members would immediately fall in the chamber 36 through which must pass in any case the totality of the liquid before reaching the flexible dispensing pipe.

The chamber 36, in which the measured liquid flows upon emptying of the measuring device through the medium of the body 13 of the distributor and of the discharge pipe 16, is constituted, as in the case of the measuring device itself, by a glass sleeve 37, clamped by four tie-rods 38 with interposition of plastic packings 39, between the body of the apparatus and a plate 40. This plate carries, at its center, a branch 41, the cross section of which is throttled by a diaphragm 42, adapted to check the flow of the liquid in the flexible dispensing pipe 43, and to determine its temporary rise in the chamber 36.

In the said chamber 36, a float 44 is movable vertically under the influence of the variations of level, the discharge pipe 16 serving as a guide for the said float. This float controls, through the medium of links 45, and of a beam 46 rocking about a shaft 47, the coupling device hereinafter described.

Finally, a circular sheet-metal plate 48, secured on the plate 40, constitutes a screen between the liquid jet arriving through the piping 16 and the diaphragm 42, through which the liquid must flow outside the enclosure of the float.

Figs. 2, 3 and 4 illustrate in detail the construction of the coupling mechanism by which the piston 18 is coupled to move with the slide valve 14 and disconnected therefrom. An aperture provided in the lower half of the rod 21 of the piston 18 allows a semi-annular coupling key or lever 22, oscillating about the axis X—X to enter an annular groove 49 provided in the rod 17 of the slide valve 14, when this groove is opposite the said aperture. The lever 22 rocks both about a rod 50, along which it can slide, and within a ring 51 rigid with the rod 21 of the piston 18, which drives it when the piston moves and maintains its plane of oscillation opposite the said aperture. The ring 51 is secured on the rod 21 by a slotted socket provided with a clamping screw 52. A spring 53, secured on the ring 51, tends to cause the lever 22 to rotate in the direction of the arrow F, that is to say to cause it to enter the groove 49 of the rod 17.

The disengagement or uncoupling, upon downward movement of the float 44, is obtained in the following manner:

The outer end of the beam 46 carries a finger 54 (Fig. 4) rocking about a spindle 55 and restored to the position shown in Fig. 4 by a spring 56. This finger is provided with a claw 57 which, when the float rises, lowers without acting on the heel piece of the lever 22, owing to the incline provided on the lower part of this claw, and owing to the slight angular variation which can be taken by the position of the finger 54 relatively to the beam 46, by stretching the spring 56. On the contrary, when the float lowers, the finger rises; the claw 57 abuts under the heel piece of the coupling lever, provided with a wear member 58. The heel piece of the coupling lever rises, and the oscillation of the latter about the axis X—X, releases the rod 17 of the slide valve 14.

As soon as the expansion of the liquid in the distributor allows the action of the antagonistic spring 24 to exert itself, the piston 18, by moving towards the right, draws the coupling lever 22 along with it. In this displacement, the heel piece of this lever releases the claw 57, and the float can again follow the lowering of the level of the liquid in the enclosure in which it moves, lifting again the claw 57 above the position in which it can be in engagement with the heel piece of the coupling lever.

The end of the rod 17 has the shape of a cone, the angle of which, at the apex, is relatively small, thus allowing the said member, in the relative displacement of the two pistons, to act as a wedge, by pushing back the lever 22 and compressing the spring 53, until the lever, still urged by the spring 53 suddenly falls back into the groove 49 thereby coupling the two pistons 14 and 18.

The operation is as follows:

The apparatus, when at rest, being, concerning the mechanism of the distributor, in the position of Fig. 1, the liquid delivered by the supply element (pump or tank under pressure not shown) and admitted through the orifice 15, freely passes through the body 13 of the distributor and enters and fills the measuring device 1. At the end of the filling up operation, the float 10 is lifted by the liquid, and the valve 9 it actuates comes on to its seat and closes the measuring device 1 at its upper part. The liquid no longer finding an access towards the measuring device, continues to be supplied owing to the space provided by the pressure accumulator 30, compressing the air which is contained in this latter element. The pressure progressively rises within the body 13 and being differentially exerted on both pistons 14 and 18, overcomes the action of the antagonistic spring 24 and the frictional retarding forces, the two pistons, coupled together by the lever 22, move towards the left, closing communication between the supply opening 15 and the measuring device 1 and opening communication between the latter and the chamber 36.

The liquid, flowing more rapidly from the measuring device 1 towards the chamber 36 than from the latter towards the exterior, rises in the chamber 36 and lifts the float 44. The rising of the latter determines a change of position of the lever 46 and the lowering of the finger 54 (Fig. 4); until, under the action of the spring 56, the claw 58 comes in engagement with the heel piece 57 of the lever 22.

When the measuring device 1 is completely emptied, the liquid begins to lower in the chamber 36, together with the float 44 the downward movement of which causes the rising of the finger 54, the rocking of the lever 22, and the uncoupling of the two pistons 14 and 18. The piston 14 being thus solely subjected to the pressure existing in the enclosure of the distributor, suddenly passes from the left-hand position to the right-hand position of Fig. 1, closing the discharge orifice of the measuring device 1 and opening the orifice admitting the liquid in this measuring device. The liquid, contained in the enclosure of the distributor and in the body of the accumulator, and maintained under pressure by the compressed air in the latter element, even if the pump is stopped, can then flow into the measuring device 1. The pressure immediately lowers in the enclosure of the distributor, the action of the antagonistic spring again overcomes the pressure exerted by the liquid on the piston 18, and the latter is returned, under the influence of the spring, to its right-hand position, in which the lever 22, still urged by the spring 53, re-enters the groove 49 as soon as it is opposite the latter, coupling both pistons again together.

The analysis of the above mentioned conditions of operation allow to see that:

1. The passage from the position of admission to the measuring device to the discharge position of the latter can take place only when the pressure rises in the enclosure constituted at this moment by the measuring device and the body of the distributor. This increase of pressure can occur only when the liquid can no longer enter the measuring device, that is to say when the latter is completely filled, the valve 9 then closing the discharge orifice at the upper part of the measuring device.

2. The said displacement towards the left of Fig. 1 of the structure constituted by the distributor and the piston can take place only if these two elements are securely coupled together, that is to say if the coupling has been effected. Consequently the reverse movement (passage of the distributor from the discharge position to the position of admission) can occur only after operation of the uncoupling mechanism. Now, uncoupling can take place only if, in the first place, the float has risen (emptying of the contents of the measuring device into the enclosure of the float) setting the device constituted by the finger 57 and the heel piece 58 of the locking bolt 22, and if, subsequently, its downward movement has been initiated (which is only possible after complete emptying of the measuring device), causing the finger 54 to rise and the coupling bolt 22 to rock.

In addition to the advantages already indicated, the following can be added: the outflow through the flexible conduit during dispensation of any quantity of liquid, is always continuous since the enclosure of the float is never completely emptied before the measuring device or devices are again filled up at the operator's desire. On the other hand, if it is considered useful to provide the flexible dispensing pipe 43, with a cock or other stop member, so as to be able of momentarily interrupting the outflow in case of need, the apparatus is never out of adjustment as is the case with some existing apparatus. In the apparatus forming the subject-matter of the invention, if the discharge is momentarily interrupted, the measuring device continues to empty in the enclosure of the float, and when the said enclosure will have been emptied, upon resuming the distribution, the mechanism will be placed in suitable conditions for continuing, without getting out of order, the remainder of the operations.

Claims:—

1. In a dispensing apparatus, a measuring device, a dispensing conduit, an enclosure between the measuring device and the conduit, means for retarding the rate of liquid outflow from the enclosure with respect to the inflow thereto, a float in said enclosure, a two-part distributing element subjected to and operated by the pressure of liquid admitted to the measuring device, and means controlled by said float for coupling and uncoupling the parts of said dispensing element.

2. In a dispensing apparatus, a measuring device, a dispensing conduit, an enclosure between the measuring device and the conduit, means for retarding the rate of liquid outflow from the enclosure with respect to the inflow thereto, a float in said enclosure, a two-part distributing element associated with the measuring device and subjected to and operated by the pressure of liquid admitted to the measuring device, a releasable coupling member connecting the parts of said distributing element and controlled by said float.

3. In a dispensing apparatus, a measuring device, a dispensing conduit, an enclosure between the measuring device and the conduit means for retarding the rate of liquid outflow from the enclosure with respect to the inflow thereto, a float in said enclosure, a two-part distributing element associated with the measuring device and subjected to and operated by the pressure of liquid admitted to the measuring device, a releasable coupling member connecting the parts of said distributing element and controlled by said float, whereby during descent of the latter the parts of the distributing element are uncoupled.

4. An apparatus as claimed in claim 2, characterized by the provision of means coacting with the distributing element and operating in response to a reduction of pressure acting on the element to restore the parts of the latter to initial position.

5. An apparatus as claimed in claim 2, characterized by the provision of means coacting with the distributing element and operating in response to a reduction of pressure acting on the element to restore the parts of the latter to initial position, and a chamber in constant communication with the fluid entering the measuring device and constituting a yieldable cushion for said fluid.

6. An apparatus as claimed in claim 2, characterized in that the parts of the distributing element are of different diameter and act alternately under the influence of the liquid pressure to shift the position of the distributing element following the engagement and release of the coupling member.

7. An apparatus as claimed in claim 2, characterized in that the parts of the distributing element are constituted by differential pistons, the larger piston acting, when coupled with the smaller piston, to cut off admission of liquid to the measuring device, and the smaller piston acting, when uncoupled from the larger piston, to admit liquid to the measuring device.

8. An apparatus as claimed in claim 2, characterized in that the parts of the distributing element are constituted by differential pistons, the larger piston acting, when coupled with the smaller piston, to cut off admission of liquid to the measuring device, and the smaller piston acting, when uncoupled from the larger piston, to admit liquid to the measuring device, and means acting upon the larger piston in response to reduction of pressure of the incoming liquid to return the latter to initial position with the respect to the smaller piston.

9. In a dispensing apparatus, a measuring device, a dispensing conduit, an enclosure between the measuring device and conduit, a supply conduit for the measuring device, a float in said enclosure, a distributing member controlling liquid passage from the liquid supply to the measuring device and from the measuring device to the dispensing conduit, fluid pressure operated means for shifting the distributing member from a position to permit filling of the measuring device to a position to permit emptying thereof, a coupling member connecting said fluid pressure operated means with the distributing member, and means operated during the descent of said float to release the coupling member.

10. An apparatus as claimed in claim 9, characterized by the provision of means for retarding the rate of liquid outflow from the enclosure with respect to the inflow thereto.

11. An apparatus as claimed in claim 9, characterized in that the outlet of the enclosure is smaller than the inlet thereof.

12. In a dispensing apparatus, a measuring device, a dispensing conduit, an enclosure between the measuring device and the conduit, means for retarding the rate of liquid outflow from the enclosure with respect to the inflow thereto, a float in said enclosure, a pressure operated distributing member subjected to the pressure of the liquid passing to the measuring device, means for allowing said pressure to shift alternatively the distributing member in one direction or in the reverse one, means controlled by the descent motion of the float, and causing the said alteration in the action of the pressure.

13. In a dispensing apparatus, a measuring device, a dispensing conduit, an enclosure between the measuring device and the conduit, means for retarding the rate of liquid outflow from the enclosure with respect to the inflow thereto, a float in said enclosure, a pressure operated distributing member subjected to the pressure of the liquid passing to the measuring device, differential means for allowing said pressure to shift alternatively the distributing member in one direction or in the reverse one, means controlled by the descent motion of the float, and causing the said alteration in the action of pressure.

The foregoing specification of my "improvements in gasoline distributing apparatus" signed by me this 2nd day of May, 1930.

ADRIEN MARCEL LUCIEN TRIBOUT.